(12) United States Patent
Chang et al.

(10) Patent No.: US 7,880,349 B2
(45) Date of Patent: Feb. 1, 2011

(54) STATOR LEAD RETAINER DEVICE

(75) Inventors: Chih-Chin Chang, Hsi-Chih (TW);
Ronald Hsiung, Hsi-Chih (TW)

(73) Assignee: Victory Industrial Corporation, Hsi-Chih (TW)

( * ) Notice: Subject to any disclaimer, the term of this patent is extended or adjusted under 35 U.S.C. 154(b) by 675 days.

(21) Appl. No.: 11/736,283

(22) Filed: Apr. 17, 2007

(65) Prior Publication Data
US 2007/0252456 A1    Nov. 1, 2007

(30) Foreign Application Priority Data

Apr. 27, 2006    (TW)   ............... 95207186 U
Apr. 27, 2006    (TW)   ............... 95207187 U

(51) Int. Cl.
*H02K 11/00*    (2006.01)
(52) U.S. Cl. ......................................... 310/71; 174/650
(58) Field of Classification Search .................. 310/71, 310/87, 88; 174/650, 151, 152 R, 152 G, 174/153 G, 153 R, 135
See application file for complete search history.

(56) References Cited

U.S. PATENT DOCUMENTS

| | | | | |
|---|---|---|---|---|
| 4,656,378 A | * | 4/1987 | Atherton et al. | 310/71 |
| 4,851,725 A | * | 7/1989 | Keck | 310/71 |
| 5,975,946 A | * | 11/1999 | Watanabe | 439/557 |
| 6,429,556 B1 | * | 8/2002 | Nakamura et al. | 310/71 |
| 6,555,937 B2 | | 4/2003 | Kurahashi et al. | |
| 6,617,723 B1 | | 9/2003 | Shichijyo | |
| 6,800,974 B2 | | 10/2004 | Shichijyo | |

* cited by examiner

*Primary Examiner*—Quyen Leung
*Assistant Examiner*—Naishadh N Desai
(74) *Attorney, Agent, or Firm*—Clifford B. Perry

(57) ABSTRACT

A stator lead retainer assembly includes a stator lead retainer body and a stator lead retainer clip. The stator lead retainer body includes at least one through-hole extending longitudinally therethrough, each through-hole configured to receive a stator lead. The stator lead retainer clip is attached to the retainer body, and includes an aperture for receiving a stator lead.

21 Claims, 3 Drawing Sheets

US 7,880,349 B2

STATOR LEAD RETAINER DEVICE

CROSS REFERENCE TO RELATED APPLICATIONS

This US patent application claims priority to, and incorporates by reference in their entirety, each of the following patent applications:

TW patent application No. 95207186, filed Apr. 27, 2006, and entitled "Stator lead Retainer," now TW patent M302826; and TW patent application No. 95207187, filed Apr. 27, 2006, and entitled "Stator Lead Retainer and Assembly," now TW patent M302827.

This application also incorporates by reference the subject matter of the commonly-owned and concurrently-filed US patent application entitled "Stator Lead Retainer," Ser. No. 11/736,268.

BACKGROUND

The present invention is related to engine circuitry and more particularly to a stator lead retainer assembly.

Conventionally, the stator lead of a motor or a generator is secured by means of a screw at the end of the lead in a comparatively summary form that is similar to the wiring box for telephone set connection. However, the motor or the generator usually operates in an environment features higher humidity and dust; the use of a screw to secure a stator lead is vulnerable to contact corrosion or poor contract to significantly affect the normal operation of the motor or the generator.

FIG. 1 is a perspective view of another stator lead retainer assembly known in the prior art which attempts to improve upon the conventional device. The improved stator lead retainer assembly is essentially comprised of a wiring retainer 1 containing multiple through-holes, two holes as illustrated in FIG. 1, that are parallel with one another for each to receive penetration by a stator lead 3 (copper wire in rectangular section for industrial purpose) extending from a motor or a generator; and a metal clip 4 for external conduction in a U-shaped section is disposed externally to one end of each through-hole on the wiring retainer 1 to be inserted upon the perimeter of the stator lead 3 for the recessed portion of metal clip 4 to retain the lead wire in providing a more secured connection. However, in practice, the improved assembly has been found with the following defects:

whereas the metal clip 4 on the U-shaped section is recessed and deformed to clamp onto the perimeter of the stator lead 3, a proper tool must be used to achieve the clamping, the process is comparatively tedious;

whereas the surface of the metal clip 4 and that of the stator lead 3 are extremely smooth, and only two contact surfaces exist between the metal clip 4 and the stator lead 3, the friction therebetween is very limited and the stator lead 3 is still vulnerable to becoming disengaged after sever vibration and shaking; and whereas the metal clip 4 is deformed so to retain the stator lead 3, the metal clip 4 looses much of its original shape. In case of repair, a wrench or similar tool is used to bend the metal clip 4 the opposite way to release the stator lead 3, often resulting in the metal clip 4 being deformed or becoming broken, thereby preventing its reuse.

What is needed is an improved construction for a stator lead retainer assembly which can provide a secure and reusable connection to one or more stator leads.

SUMMARY

The present invention provides a stator lead retainer assembly having a stator lead retainer body and a stator lead retainer clip. The stator lead retainer body includes at least one through-hole extending longitudinally therethrough, each through-hole configured to receive a stator lead. The stator lead retainer clip is attached to the retainer body, and includes an aperture for receiving a stator lead.

These and other features of the invention will be better understood in light of the following drawings and detailed description.

For clarity, previously identified features retain their reference numbers in subsequent drawings.

DETAILED DESCRIPTION OF EXEMPLARY EMBODIMENTS

Figure 1:
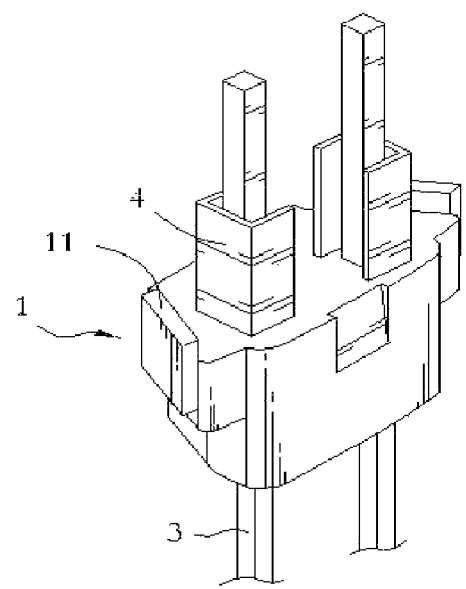
FIG. 1 is a perspective view of a conventional stator lead retainer assembly known in the prior art.
Figure 2:
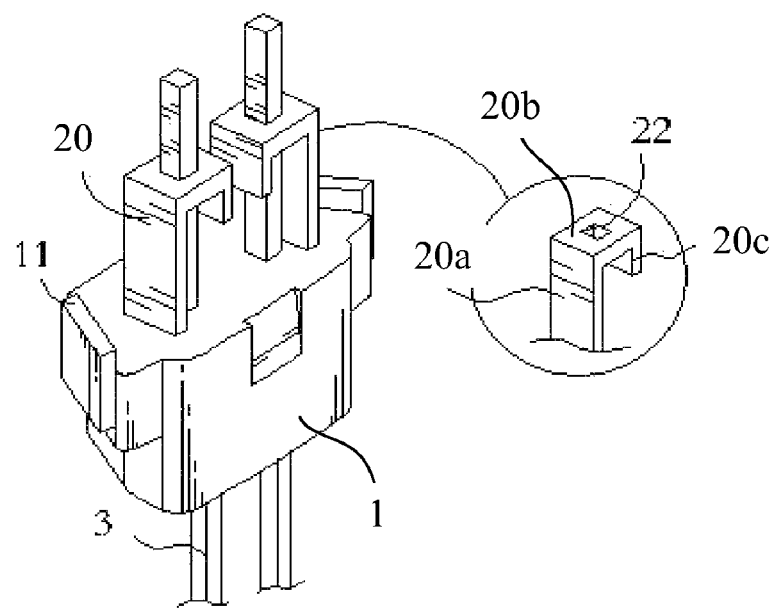
FIG. 2 is a schematic view showing a first embodiment of a stator lead retainer assembly in accordance with the present invention.

FIG. 2 is a schematic view showing a first embodiment of a stator lead retainer assembly in accordance with the present invention. The stator lead retainer assembly includes a stator lead retainer body 1, and a stator lead retainer clip 20. The stator lead retainer body 1 includes at least one (as shown, two) through-holes 11 extending longitudinally through the retainer body 1, each through-hole 11 configured to receive a stator lead 3. The retainer clip 20 is attached to the retainer body 1, the retainer clip 20 including an aperture 22 for receiving the stator lead 3.

In the exemplary embodiment of FIG. 2, the stator lead retainer clip 20 includes a first section 20a extending from the retainer body 1, and a second section 20b extending from the first section 20a. The second section 20b includes the aforementioned aperture 22 for receiving the stator lead 3. The stator lead retainer clip 20 of FIG. 2 further includes a third section 20c which extends from the second section 20b. Projections 11 may be used to secure the stator lead retainer assembly to another unit, for example, a generator or rectifier in an automobile.

Figure 3:
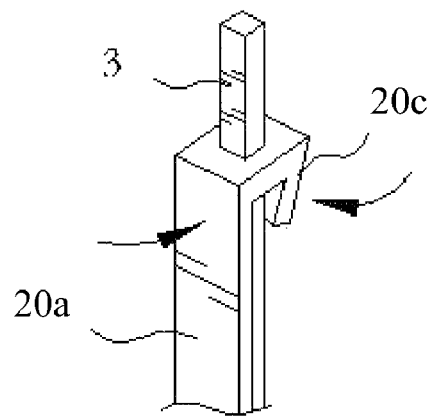
FIG. 3 is a schematic view showing the stator lead retainer clip of FIG. 2 in accordance with one embodiment of the present invention.

FIG. 3 is a schematic view showing the stator lead retainer clip 20 of FIG. 2 in accordance with one embodiment of the present invention. When the stator lead 3 is inserted into the aperture 22 of the retainer clip 20, the third section 20c can be bent towards the stator lead 3 (as shown by the arrows), resulting in one or more of the first, second, and/or third sections 20a, 20b, 20c coming into electrical and physical contact with the stator lead and securing it. The stator lead retainer clip 20 is electrically coupled to a corresponding conductor (not shown) located on the outer surface of the retainer body 1 for connection to external units, e.g., an automotive rectifier or generator unit. The shape (cut-out) of the aperture 22 may take on any particular shape. For example, the aperture may have a circular or elliptical shape, a triangular shape, or a square or rectangular shape. The stator lead retainer clip 20 may be constructed from a variety of different conductive materials, for example copper.

Disengagement of the stator lead retainer assembly from the stator leads 3 is effectuated by returning the third section 20c to its previous orientation, thereby releasing the physical and electrical connection therebetween. The dimensions and construction of the stator lead retainer clip 20 are such to permit repeated bending in the opposite direction so to free the stator lead for facilitating repair and maintenance and repeated use of the associate retainer member. In a particular embodiment, the stator lead retainer clip 20 is constructed from copper, the first section 20a measures 7 mm×3.6 mm×0.8 mm (height×length×width), the second section 20b measures 5 mm×3.6 mm×0.8 mm (height×length×width), and the third section 20c measures 5 mm×3.6 mm×0.8 mm (height×length×width). Of course, other materials, and/or dimensions may be implemented in alternative embodiments of the present invention.

Figure 4:
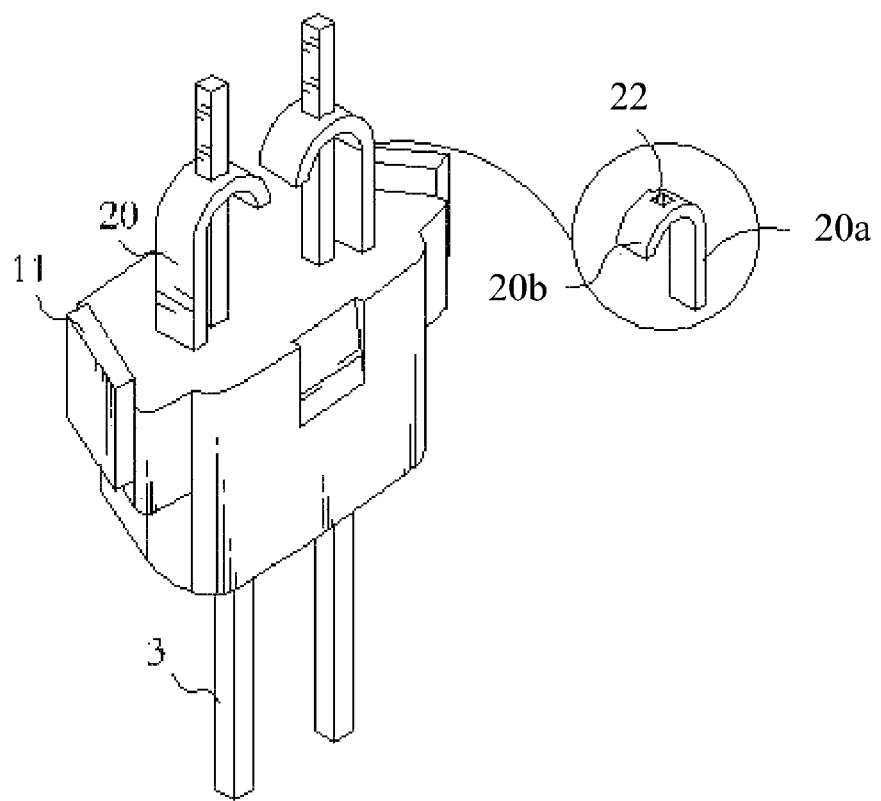
FIG. 4 is a schematic view showing a second embodiment of a stator lead retainer assembly in accordance with the present invention.

FIG. 4 is a schematic view showing a second embodiment of a stator lead retainer assembly in accordance with the present invention, with previously described features retainer their reference indicia. In contrast to the exemplary embodiment shown in FIGS. 2 and 3 in which the stator lead retainer clip 20 is constructed from sections of a generally linear shape, the stator lead retainer clip of FIGS. 4 and 5 includes an arc-shaped second section 20b'.

Figure 5:
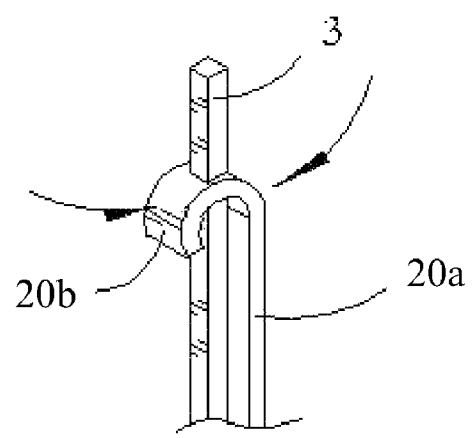
FIG. 5 is a schematic view showing the stator lead retainer clip of FIG. 4 in accordance with one embodiment of the present invention.

In this embodiment of the invention, a stator lead 3 is secured to stator lead retainer clip 20 by applying force to the first section 20a and the end of the second section 20b', as shown by the arrows in FIG. 5. In such doing, the second section 20b' is bent towards the stator lead 3, resulting in either one or both of the first or the second sections 20a, 20b coming into electrical and physical contact with the stator lead and securing it. As above, the stator lead retainer clip 20 is electrically coupled to a corresponding conductor (not shown) located on the outer surface of the retainer body 1 for connection to external units, e.g., an automotive rectifier or generator unit. The shape (cut-out) of the aperture 22 may take on any particular shape and be formed from the same types of materials as exemplary noted above.

Disengagement of the stator lead retainer assembly from the stator leads 3 is effectuated similar as above, i.e., by returning the second section 20b' to its previous orientation, thereby releasing the physical and electrical connection therebetween. The dimensions and construction of the stator lead retainer clip 20 are such to permit repeated bending in the opposite direction so to free the stator lead for facilitating repair and maintenance and repeated use of the associate retainer member. In a particular embodiment, the stator lead retainer clip 20 is constructed from copper, the first section 20a measures 7 mm×3.6 mm×0.8 mm (height×length×width), and the second section 20c measures 5 mm×3.6 mm×0.8 mm (height×length×width), and has an arc of 180 degrees. Of course, other materials, and/or dimensions may be alternatively implemented in alternative embodiments of the present invention.

A method of manufacturing a stator lead assembly in accordance with one embodiment of the present invention is now described. A stator lead retainer body 1 is constructed having at least one through-hole 11 extending longitudinally therethrough, each through-hole configured to receive a stator lead 3. A stator lead retainer clip 20 is attached to the retainer body 1, the retainer clip 20 including an aperture 22 for receiving the stator lead.

In a particular embodiment, the stator lead retainer clip 20 is constructed to include a first section 20a extending from the retainer body 1, and a second section 20b extending from the first section 20a, wherein the second section 20b includes the aperture 22 for receiving the stator lead 3. Further particularly, the second section 20b may be arc-shaped or it may be substantially linear, as shown in FIGS. 3 and 4. Optionally, construction of the stator lead retainer clip 20 may further include forming a third section 20c extending from the second section 20b. In such an embodiment, the third section 20c may be configured for bending towards the first section 20a to secure a stator lead 3 within the aperture 22. Construction of the stator lead retainer body 1 and the stator lead retainer clip 20 may include the formation of the additional features, as described above.

The terms "a" or "an" are used to refer to one, or more than one feature described thereby. Furthermore, the term "coupled" or "connected" refers to features which are in communication with each other (electrically, mechanically, thermally, as the case may be), either directly, or via one or more intervening structures or substances. The sequence of operations and actions referred to in method flowcharts are exemplary, and the operations and actions may be conducted in a different sequence, as well as two or more of the operations and actions conducted concurrently. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A stator lead retainer assembly, comprising
a stator lead retainer body having at least one through-hole extending longitudinally therethrough, each through-hole configured to receive a stator lead; and
a stator lead retainer clip attached to the retainer body, the stator lead retainer clip including an aperture extending through the surface of the stator lead retainer clip for receiving the stator lead therethrough.

2. The stator lead retainer assembly of claim 1,
wherein the stator lead retainer clip comprises a first section extending from the retainer body, and a second section extending from the first section,
wherein the second section includes said aperture for receiving said stator lead.

3. The stator lead retainer assembly of claim 2, wherein the second section is arc-shaped.

4. The stator lead retainer assembly of claim 3, wherein the second section is configured for bending toward the first section to secure a stator lead within the aperture.

5. The stator lead retainer assembly of claim 2, the stator lead retaining device further comprising a third section extending from the second section.

6. The stator lead retainer assembly of claim 5, wherein the third section is configured for bending towards the first section to secure a stator lead within the aperture.

7. The stator retainer assembly of claim 1, wherein the stator lead retainer clip is electrically coupled to a conductor disposed on the outer surface of the stator lead retainer body.

8. The stator lead retaining assembly of claim 1, wherein the stator lead retainer body includes one or more projections for securing the stator lead retainer assembly to either a generator or rectifier.

9. A stator lead retainer assembly, comprising
a stator lead retainer body having at least one through-hole extending longitudinally therethrough, each through-hole configured to receive a stator lead; and
a stator lead retainer clip attached to the retainer body, the stator lead retainer clip comprising:
a first section extending from the retainer body; and
a second section extending from the first section,
wherein the second section includes an aperture extending through the surface of the stator lead retainer clip for receiving the stator lead therethrough.

10. The stator lead retainer assembly of claim 9, wherein the second section is arc-shaped.

11. The stator lead retainer assembly of claim 10, wherein the second section is configured for bending toward the first section to secure a stator lead within the aperture.

12. The stator lead retainer assembly of claim 9, the stator lead retaining device further comprising a third section extending from the second section.

13. The stator lead retainer assembly of claim 12, wherein the third section is configured for bending towards the first section to secure a stator lead within the aperture.

14. The stator retainer assembly of claim 12, wherein the stator lead retainer clip is electrically coupled to a conductor disposed on the outer surface of the stator lead retainer body.

15. A method of manufacturing a stator retainer assembly, comprising:
constructing a stator lead retainer body having at least one through-hole extending longitudinally therethrough, each through-hole configured to receive a stator lead; and
constructing a stator lead retainer clip attached to the retainer body, the stator lead retainer clip including an aperture extending through the surface of the stator lead retainer clip for receiving the stator lead therethrough.

16. The manufacturing method of claim 15,
wherein the stator lead retainer clip is constructed to include a first section extending from the retainer body, and a second section extending from the first section,
wherein the second section is constructed to receive said stator lead.

17. The manufacturing method of claim 16, wherein the second section is constructed in an arc-shape.

18. The manufacturing method of claim 16, the stator lead retaining device constructed to further include a third section extending from the second section.

19. A method of manufacturing a stator lead retainer assembly, comprising
constructing a stator lead retainer body having at least one through-hole extending longitudinally therethrough, each through-hole configured to receive a stator lead; and
constructing a stator lead retainer clip attached to the retainer body, the stator lead retainer clip comprising:
forming a first section extending from the retainer body; and
forming a second section extending from the first section,
wherein the second section includes an aperture extending through the surface of the stator lead retainer clip for receiving the stator lead therethrough.

20. The manufacturing method of claim 19, wherein the second section is constructed in an arc-shape.

21. The manufacturing method of claim 19, the stator lead retaining device constructed to further include a third section extending from the second section.

* * * * *